(12) United States Patent
Sahoo et al.

(10) Patent No.: US 12,032,217 B2
(45) Date of Patent: Jul. 9, 2024

(54) CABLE WITH INTERSTITIAL FILLERS AND EDGE RIBBONS

(71) Applicant: Sterlite Technologies Limited, Gurgaon (IN)

(72) Inventors: Kishore Sahoo, Gurugram (IN); Sravan Kumar, Gurugram (IN); Atulkumar Mishra, Gurugram (IN); Vikash Shukla, Gurugram (IN); Akhil Garg, Gurugram (IN); Hemanth Kondapalli, Gurugram (IN); Mahesh Deshpande, Gurugram (IN); Gahininath Shinde, Gurugram (IN); Venkatesh Murthy, Gurugram (IN); Pramod Marru, Gurugram (IN)

( * ) Notice: Subject to any disclaimer, the term of this patent is extended or adjusted under 35 U.S.C. 154(b) by 0 days.

(21) Appl. No.: 16/987,797

(22) Filed: Aug. 7, 2020

(65) Prior Publication Data

US 2021/0041655 A1    Feb. 11, 2021

(30) Foreign Application Priority Data

Aug. 7, 2019    (IN) .............................. 201911031933
Oct. 11, 2019   (IN) .............................. 201911041285

(51) Int. Cl.
*G02B 6/44*    (2006.01)

(52) U.S. Cl.
CPC .......... *G02B 6/4403* (2013.01); *G02B 6/441* (2013.01); *G02B 6/4429* (2013.01); *G02B 6/4432* (2013.01); *G02B 6/4436* (2013.01); *G02B 6/44384* (2023.05); *G02B 6/4404* (2013.01); *G02B 6/4431* (2023.05); *G02B 6/4434* (2013.01); *G02B 6/448* (2013.01); *G02B 6/4483* (2013.01)

(58) Field of Classification Search
CPC .... G02B 6/4403; G02B 6/4404; G02B 6/441; G02B 6/4429; G02B 6/4432; G02B 6/4434; G02B 6/4436; G02B 6/448; G02B 6/4483; G02B 6/4494; G02B 6/4495

See application file for complete search history.

(56) References Cited

U.S. PATENT DOCUMENTS 5,133,034 A * 7/1992 Arroyo ................ G02B 6/4494
                                                      385/103
5,621,841 A * 4/1997 Field .................... G02B 6/4416
                                                      385/113

(Continued)

*Primary Examiner* — Ryan A Lepisto
(74) *Attorney, Agent, or Firm* — Steven R. Fairchild; Michael J. Pennington

(57) ABSTRACT

The present disclosure provides an optical fibre cable. The optical fibre cable includes a plurality of buffer tubes and a plurality of interstitial fillers in spaces between the plurality of buffer tubes. The plurality of interstitial fillers is arranged in spaces between the plurality of buffer tubes. The optical fibre cable may include a plurality of water swellable yarns. There is an optical fibre ribbon stack including a plurality of optical fibre ribbons. The plurality of optical fibre ribbons are stacked to form the optical fibre ribbon stack. The present disclosure provides a fire retardant optical fibre cable includes the plurality of buffer tubes and one or more numbers of interstitial fillers and includes at least one of a thermal resistant water blocking tape, a fire resistant water blocking tape and a Mica tape wrapped over the core of the fire retardant optical fibre cable.

6 Claims, 10 Drawing Sheets

(56) References Cited

U.S. PATENT DOCUMENTS

| | | | | |
|---|---|---|---|---|
| 5,630,003 | A * | 5/1997 | Arroyo | G02B 6/4494 |
| | | | | 385/103 |
| 6,014,487 | A * | 1/2000 | Field | G02B 6/4407 |
| | | | | 385/113 |
| 6,304,701 | B1 * | 10/2001 | Bringuier | G02B 6/4494 |
| | | | | 385/103 |
| 6,421,486 | B1 * | 7/2002 | Daneshvar | G02B 6/4482 |
| | | | | 385/109 |
| 6,519,399 | B2 * | 2/2003 | Strong | G02B 6/4411 |
| | | | | 385/109 |
| 6,870,995 | B2 * | 3/2005 | Johnson | G02B 6/4411 |
| | | | | 385/112 |
| 6,922,512 | B2 * | 7/2005 | Nechitailo | G02B 6/4494 |
| | | | | 385/113 |
| 8,639,076 | B2 * | 1/2014 | Keller | G02B 6/4429 |
| | | | | 385/113 |
| 8,909,012 | B2 * | 12/2014 | Register, III | H01B 11/22 |
| | | | | 385/103 |
| 9,086,556 | B2 * | 7/2015 | Keller | G02B 6/4429 |
| 9,459,423 | B2 * | 10/2016 | Gallo | G02B 6/4436 |
| 10,388,430 | B1 * | 8/2019 | Evans | H01B 7/0275 |
| 10,627,589 | B2 * | 4/2020 | Lang | G02B 6/443 |
| 2003/0202757 | A1 * | 10/2003 | Um | G02B 6/4494 |
| | | | | 385/102 |
| 2009/0190890 | A1 * | 7/2009 | Freeland | G02B 6/4494 |
| | | | | 385/113 |
| 2012/0281953 | A1 * | 11/2012 | Choi | G02B 6/4416 |
| | | | | 385/101 |
| 2015/0354292 | A1 * | 12/2015 | Frazer | E21B 17/206 |
| | | | | 428/36.3 |
| 2018/0292625 | A1 * | 10/2018 | Lang | G02B 6/443 |
| 2020/0319419 | A1 * | 10/2020 | Neveux, Jr. | G02B 6/443 |

\* cited by examiner

100

300

600

900

CABLE WITH INTERSTITIAL FILLERS AND EDGE RIBBONS

BACKGROUND OF THE INVENTION

Field of the Invention

The present disclosure relates to the field of optical fibre and, in particular, relates to an optical fibre cable with interstitial fillers. The present application is based on, and claims priority from Indian Application Number 201911031933 filed on 07th August 2019 and Indian Application Number 201911041285 filed on 11th October 2019, the disclosure of which is hereby incorporated by reference herein.

Description of the Related Art

Optical fibre ribbon cables have secured an important position in building optical network of modern communication systems across the world. Conventionally, optical fibre ribbon cable is made of bend sensitive fibres. In addition, the optical fibre ribbon cable has high fibre count that leads to generation of stresses on edge fibres. In addition, generation of stresses on edge fibres leads to high attenuation during data transmission. Further, the optical fibre ribbon cable is not flexible. Furthermore, the optical fibre ribbon cable does not have the ability to withstand high stresses. Moreover, the optical fibre ribbon cable with high fibre count is unsustainable at negative temperature due to compact structure of the optical fibre ribbon cable. Also, the optical fibre ribbon cable lead to contraction of tubes and polymer sheath of outer layer during high negative temperatures. Also, contraction of tubes and polymer sheath of outer layer of the optical fibre ribbon cable generates more stresses on fibres which lead to loss of data during transmission and reception. Also, the optical fibre ribbon cable with high fibre count needs water blocking tape inside the tube to prevent ingression of water inside the optical fibre ribbon cable. However, the water blocking tape inside the optical fibre ribbon cable increases overall diameter of the optical fibre ribbon cable diameter.

In light of the above stated drawbacks, there is a need for an improved optical fibre cable.

BRIEF SUMMARY OF THE INVENTION

In an aspect, the present disclosure provides an optical fibre cable. The optical fibre cable includes a plurality of buffer tubes and a plurality of interstitial fillers in spaces between the plurality of buffer tubes.

The plurality of interstitial fillers may be arranged at an angle of 24-120 degrees with respect to a centre of the optical fibre cable.

A number of the plurality of interstitial fillers is greater than or equal to a number of the plurality of buffer tubes.

The plurality of interstitial fillers is made of fibre reinforced plastic coated with high density polyethylene.

The optical fibre cable may include a plurality of water swellable yarns such that a number of the plurality of water swellable yarns is equal to a sum of a number of the plurality of interstitial fillers and a number of the plurality of buffer tubes.

The plurality of buffer tubes may be arranged in at least two concentric layers of buffer tubes in the optical fibre cable.

At least one interstitial filler of the plurality of interstitial fillers may be coated with high density polyethylene.

In another aspect, the present disclosure provides an optical fibre ribbon stack for use in the optical fibre cable. The optical fibre ribbon stack includes a plurality of optical fibre ribbons. The plurality of optical fibre ribbons are stacked to form the optical fibre ribbon stack. The optical fibre ribbon stack has one or more top optical fibre ribbons, one or more bottom optical fibre ribbons and one or more body optical fibre ribbons. The one or more top optical fibre ribbons has a top ribbon width. The one or more bottom optical fibre ribbons has a bottom ribbon width. The one or more body optical fibre ribbons has a body ribbon width. At least one of the top ribbon width and the bottom ribbon width is not equal to the body ribbon width.

At least one of the top ribbon width and the bottom ribbon width may be greater than the body ribbon width.

The one or more top optical fibre ribbons have a first height. In addition, the one or more bottom optical fibre ribbons have a second height. Further, the one or more body optical fibre ribbons have a third height. At least one of the first height and the second height may be greater than the third height.

In yet another aspect, the present disclosure provides a fire retardant optical fibre cable. The fire retardant optical fibre cable includes the plurality of buffer tubes and one or more numbers of interstitial fillers. The one or more numbers of interstitial fillers are arranged in spaces between the plurality of buffer tubes. In addition, the fire retardant optical fibre cable includes at least one of a thermal resistant water blocking tape, a fire resistant water blocking tape and a Mica tape wrapped over the core of the fire retardant optical fibre cable.

A first side of the thermal resistant water blocking tape may face a jacket of the fire retardant optical fibre cable. In addition, a second side of the thermal resistant water blocking tape without the intumescent material coating may face a core of the fire retardant optical fibre cable.

DESCRIPTION OF THE DRAWINGS

In order to best describe the manner in which the above-described embodiments are implemented, as well as define other advantages and features of the disclosure, a more particular description is provided below and is illustrated in the appended drawings. Understanding that these drawings depict only exemplary embodiments of the invention and are not therefore to be considered to be limiting in scope, the examples will be described and explained with additional specificity and detail through the use of the accompanying drawings in which.

Figure 1A:
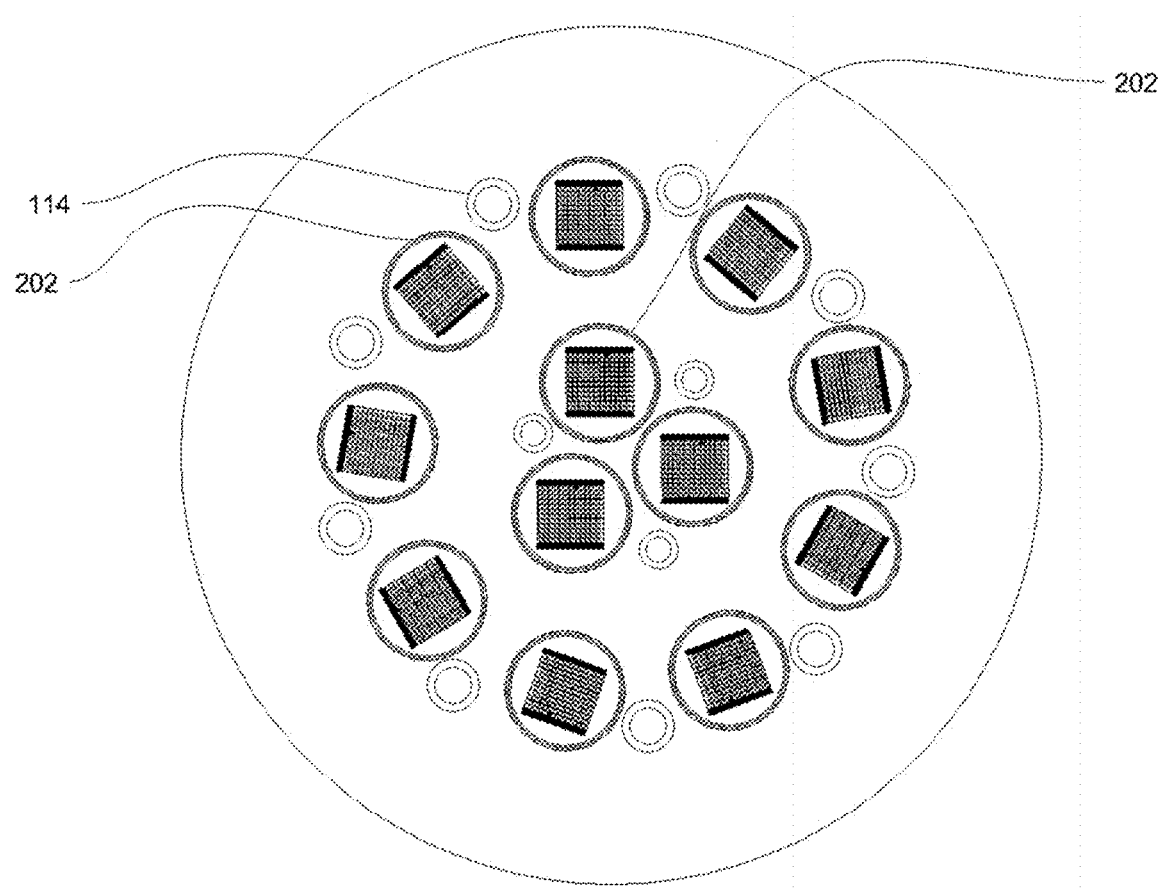
FIG. 1A illustrates an optical fibre cable that has a plurality of buffer tubes and a plurality of interstitial fillers.

It should be noted that the accompanying figures are intended to present illustrations of few exemplary embodiments of the present disclosure. These figures are not intended to limit the scope of the present disclosure. It should also be noted that accompanying figures are not necessarily drawn to scale.

REFERENCE NUMERALS IN THE DRAWINGS

For a more complete understanding of the present invention parts, reference is now made to the following descriptions:
- 100. Optical fibre cable.
- 102. Central strength member.
- 104. The first layer of buffer tubes.
- 106. The second layer of buffer tubes.
- 108. The first water blocking tape.
- 110. The second water blocking tape.
- 112. Sheath.
- 114. Plurality of interstitial fillers.
- 116. Plurality of water swellable yarns.
- 118. Plurality of embedded strength members.
- 120. One or more ripcords.
- 200. Cross sectional view.
- 202. Buffer tube.
- 204. One or more top optical fibre ribbons.
- 206. One or more bottom optical fibre ribbons.
- 208. Plurality of optical fibres.
- 210. Water swellable layer.
- 212. One or more body optical fibre ribbons.
- 214. Plurality of safeguarding elements.
- 216. Plurality of safeguarding elements.
- 302. The central strength member.
- 304. The first layer of buffer tubes.
- 306. The second layer of buffer tubes.
- 308. Thermal resistant water blocking tape.
- 310. Fire resistant water blocking tape.
- 312. Mica tape.
- 314. Jacket.
- 316. Water blocking tape.
- 318. Plurality of interstitial fillers.
- 320. Plurality of water swellable yarns.
- 322. Plurality of embedded strength members.
- 324. The one or more ripcords.
- 402. The central strength member.
- 404. The first layer of buffer tubes.
- 406. The second layer of buffer tubes.
- 408. The first water blocking tape.
- 410. The second water blocking tape.
- 412. Sheath.
- 414. The plurality of interstitial fillers.
- 416. Plurality of water swellable yarns.
- 418. One or more ripcords.
- 700. Fire retardant optical fibre cable.
- 800. Fire retardant optical fibre cable.
- 900. Optical fibre cable.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention.

Reference in this specification to "one embodiment" or "an embodiment" means that a particular feature, structure, or characteristic described in connection with the embodiment is included in at least one embodiment of the present technology. The appearance of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

Reference will now be made in detail to selected embodiments of the present disclosure in conjunction with accompanying figures. The embodiments described herein are not intended to limit the scope of the disclosure, and the present disclosure should not be construed as limited to the embodiments described. This disclosure may be embodied in different forms without departing from the scope and spirit of the disclosure. It should be understood that the accompanying figures are intended and provided to illustrate embodiments of the disclosure described below and are not necessarily drawn to scale. In the drawings, like numbers refer to like elements throughout, and thicknesses and dimensions of some components may be exaggerated for providing better clarity and ease of understanding.

Moreover, although the following description contains many specifics for the purposes of illustration, anyone skilled in the art will appreciate that many variations and/or alterations to said details are within the scope of the present technology. Similarly, although many of the features of the present technology are described in terms of each other, or in conjunction with each other, one skilled in the art will appreciate that many of these features can be provided independently of other features. Accordingly, this description of the present technology is set forth without any loss of generality to, and without imposing limitations upon, the present technology.

It should be noted that the terms "first", "second", and the like, herein do not denote any order, ranking, quantity, or importance, but rather are used to distinguish one element from another. Further, the terms "a" and "an" herein do not denote a limitation of quantity, but rather denote the presence of at least one of the referenced item.

Figure 1B:
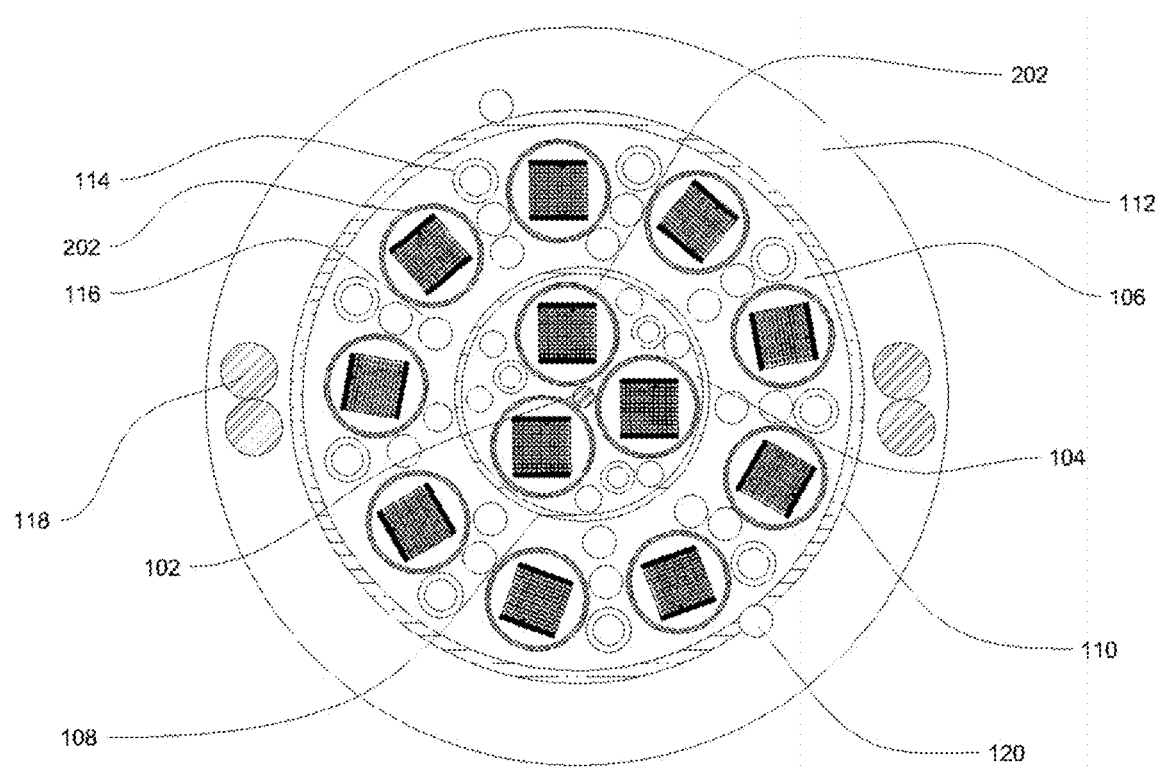
FIG. 1B illustrates a cross sectional view of the optical fibre cable having 1728 optical fibres.
Figure 2:
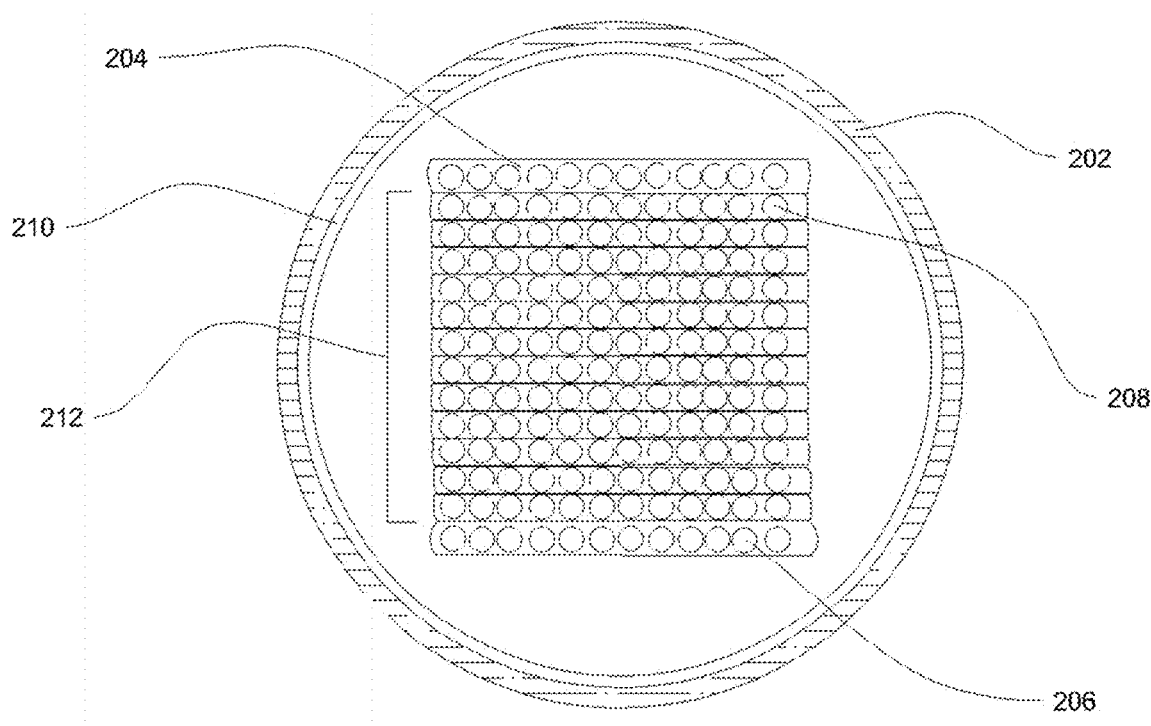
FIG. 2 illustrates a cross sectional view of a buffer tube

According to FIG. 1A and FIG. 1B, this is a cross sectional view of an optical fibre cable 100 having 1728 optical fibres. FIG. 2 illustrates a cross sectional view 200 of a buffer tube 202 for an optical fibre cable 100. A buffer tube is an encasement tube used to encapsulate number of optical fibres or ribbon stack. In addition, the buffer tube is used in optical fibre cables to provide mechanical isolation and protection from physical damages. The buffer tube 202 may include an optical fibre ribbon stack, a plurality of optical fibres 208 and a water swellable layer 210.

The buffer tube 202 may include the optical fibre ribbon stack. The optical fibre ribbon stack is a plurality of optical fibre ribbons arranged together. The optical fibre ribbon includes a number of optical fibres held together by a matrix material. In addition, multiple individual optical fibre ribbons are stacked to form an optical fibre ribbon stack. Each of the plurality of optical fibre ribbons includes the plurality of optical fibres 208.

Number of the plurality of optical fibres 208 in each of the plurality optical fibre ribbons is 12. In addition, number of optical fibres in each of the plurality of optical fibre ribbons of the optical fibre ribbon stack may vary.

The optical fibre ribbon stack includes the plurality of optical fibre ribbons stacked and positioned parallel over each other. The optical fibre ribbon stack is defined by one or more top optical fibre ribbons 204, one or more bottom optical fibre ribbons 206 and one or more body optical fibre ribbons 212. The one or more top optical fibre ribbons 204 correspond to top ribbons. The one or more bottom optical fibre ribbons 206 correspond to bottom ribbons. The one or more body optical fibre ribbons 212 correspond to body ribbons. The one or more top optical fibre ribbons 204 may have a top ribbon width, the one or more bottom optical fibre ribbons 206 may have a bottom ribbon width and the one or more body optical fibre ribbons 212 may have a body ribbon width. At least one of the top ribbon width and the bottom ribbon width is not equal to the body ribbon width.

Figure 3:
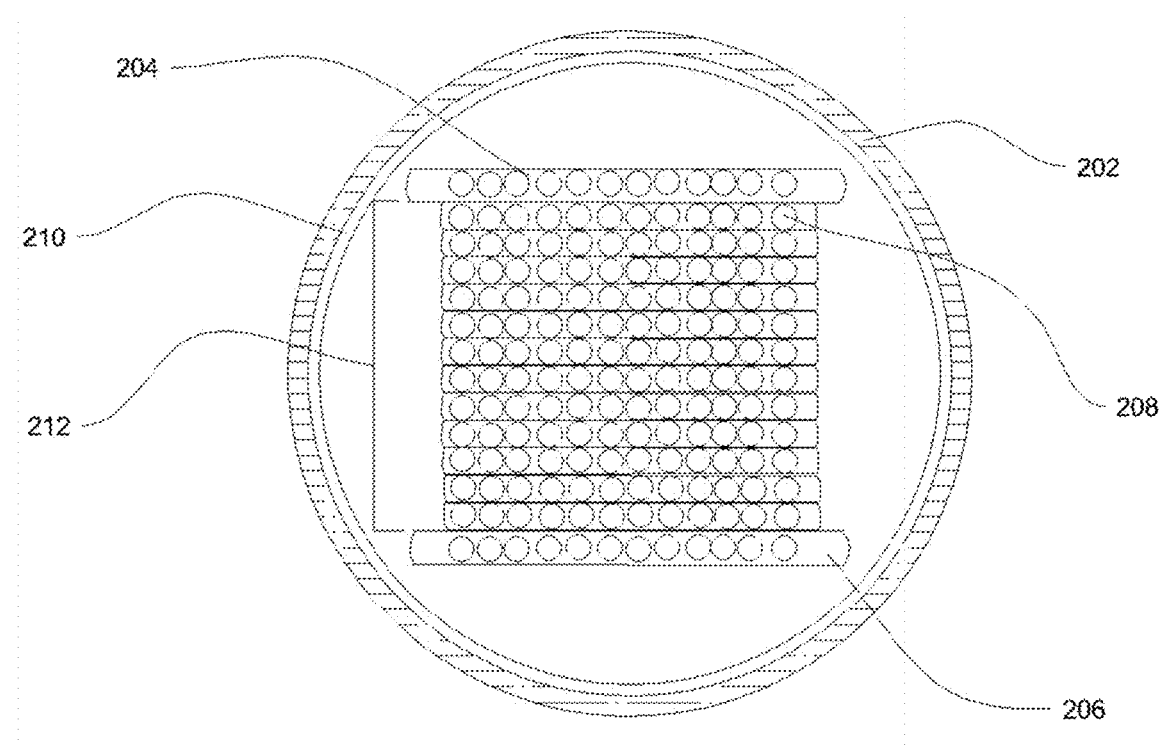
FIG. 3 illustrates another cross sectional view of another buffer tube.

At least one of the top ribbon width and the bottom ribbon width may be equal to the body ribbon width (as shown in FIG. 2). In addition, at least one of the top ribbon width and the bottom ribbon width may be greater than the body ribbon width (as shown in FIG. 3). Further, the one or more top optical fibre ribbons 204 have a first height, the one or more bottom optical fibre ribbons 206 have a second height and the one or more body optical fibre ribbons 212 have a third height. Furthermore, at least one of the first height and the second height may be greater than a third height.

The one or more top optical fibre ribbons 204 and the one or more bottom optical fibre ribbons 206 may act as a safeguarding element for the one or more body optical fibre ribbons 212. The safeguarding element may include optical fibres. The safeguarding feature may enable protection of a plurality of edge fibres positioned at edges of the optical fibre ribbon stack. Further, the safeguarding feature may prevent stresses on the plurality of optical fibre ribbons inside the buffer tube 202.

Figure 4:
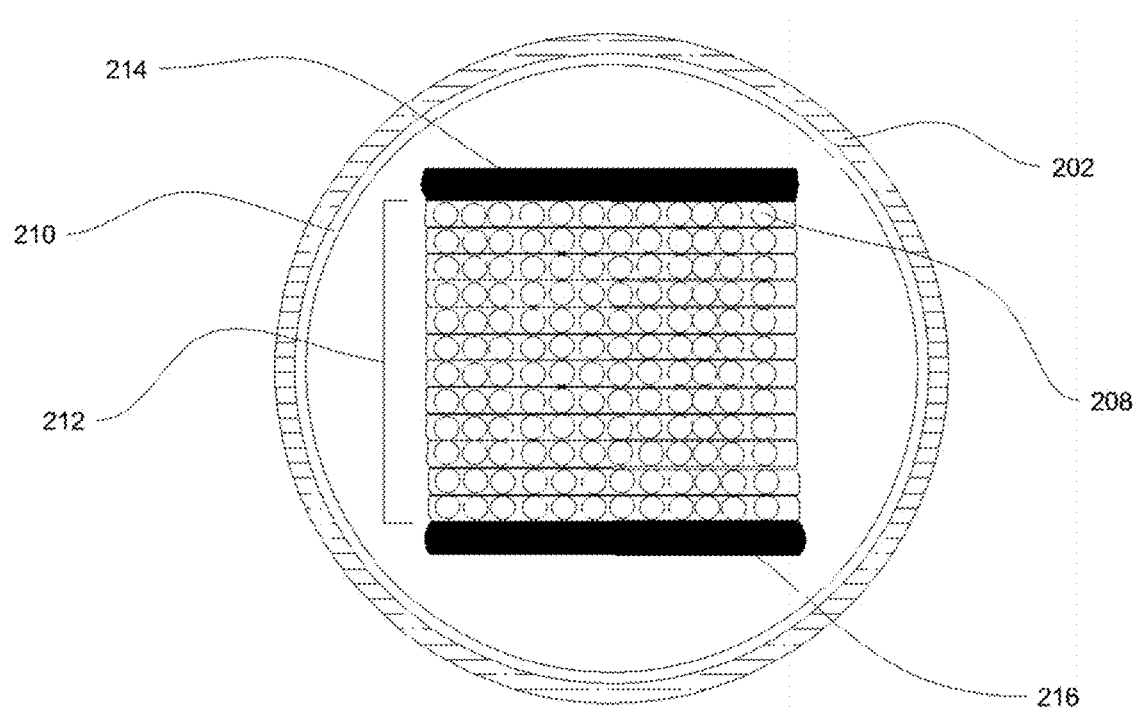
FIG. 4 illustrates yet another cross sectional view of yet another buffer tube for the optical fibre cable.
Figure 5:
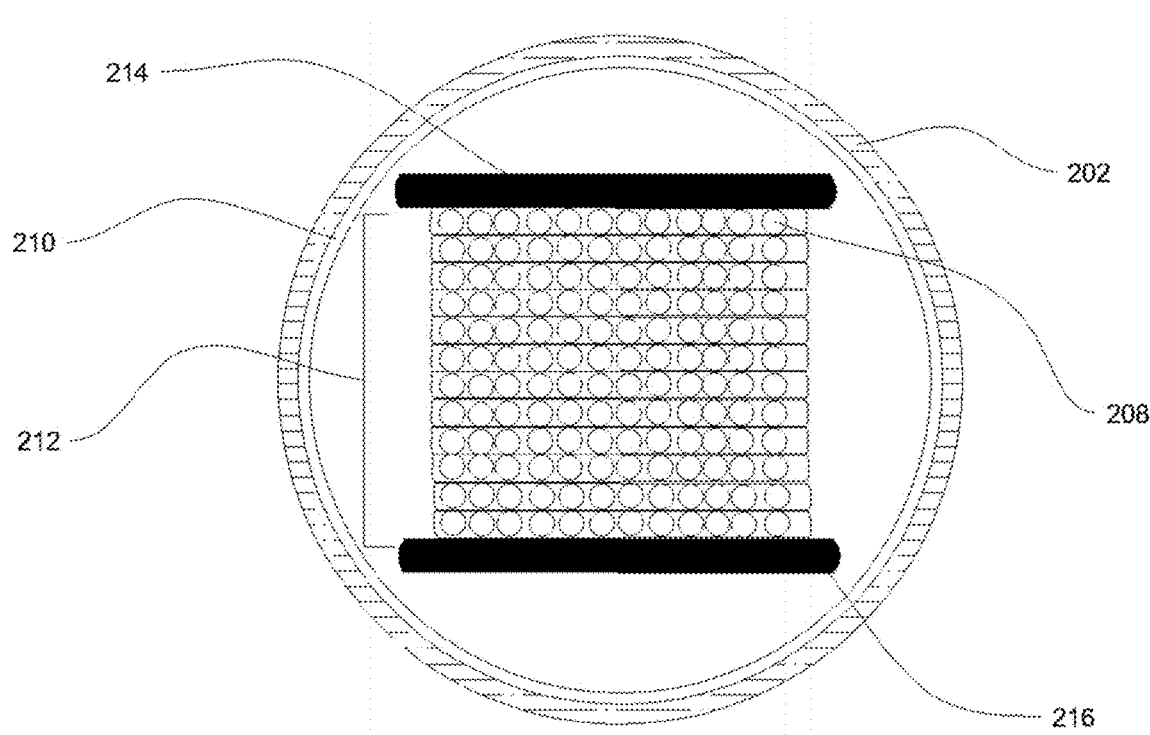
FIG. 5 illustrates yet another cross sectional view of yet another buffer tube for the optical fibre cable.

The one or more top optical fibre ribbons 204 and the one or more bottom optical fibre ribbons 206 are replaced by a plurality of safeguarding elements 214, 216 (as shown in FIG. 4 and FIG. 5). The plurality of safeguarding elements 214, 216 is made of one of bi-axially oriented polypropylene or acrylates material. Referring to FIG. 4, the buffer tube 202 includes a plurality of optical fibre ribbons as body ribbons 212 arranged in a form of an optical fibre ribbon stack. The plurality of optical fibre ribbons correspond to a plurality of body ribbons placed between the plurality of safeguarding elements 214, 216. The plurality of safeguarding elements 214, 216 is positioned at a first end and a second end of the one or more body optical fibre ribbons 212 in the buffer tube 202. The first end is a top end of the one or more body optical fibre ribbons 212. The second end is a bottom end of the one or more body optical fibre ribbons 212. In addition, the plurality of safeguarding elements 214, 216 is positioned in such a way to protect a plurality of edge fibres positioned at edges of the optical fibre ribbon stack. Further, the plurality of safeguarding elements 214, 216 prevents stresses on the plurality of optical fibre ribbons inside the buffer tube 202.

Figure 6:
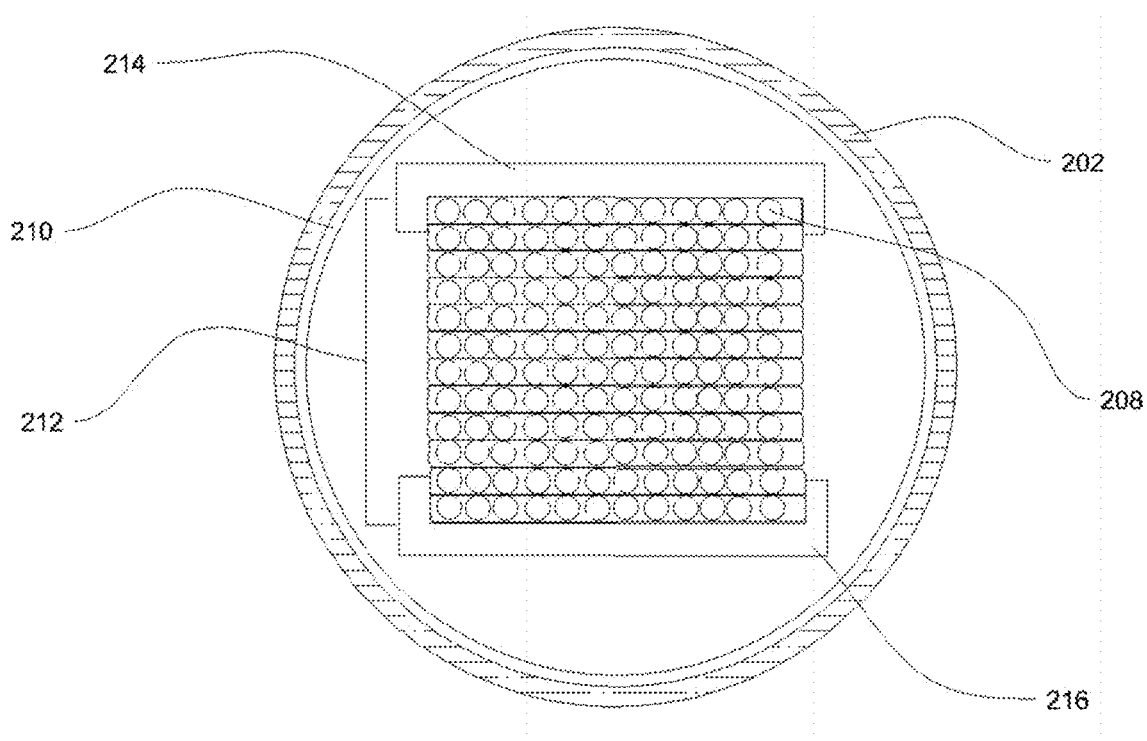
FIG. 6 illustrates yet another cross sectional view of yet another buffer tube for the optical fibre cable.

The plurality of safeguarding elements 214, 216 may have a safeguarding element height and a safeguarding element width. The safeguarding element height is different from a height of the one or more body optical fibre ribbons 212. The safeguarding element width is different from a width of the one or more body optical fibre ribbons 212. The plurality of safeguarding elements 214, 216 may have corner protected shape. The corner protected shape includes L shaped corners of the plurality of safeguarding elements 214, 216 such that one or more ribbons of the one or more body optical fibre ribbons 112 are protected from a first side and a second side of the one or more ribbons of the one or more body optical fibre ribbons 214, 216 (as shown in FIG. 6). The plurality of safeguarding elements 214, 216 in the buffer tube 202 may have the safeguarding element width equal to a width of the one or more body optical fibre ribbons 212 (as shown in FIG. 4). The plurality of safeguarding elements 214, 216 in the buffer tube 202 may have the safeguarding element width greater than a width of the one or more body optical fibre ribbons 112 (as shown in FIG. 5). The plurality of safeguarding elements 214, 216 in the buffer tube 202 may have a safeguarding element height greater than a height of the one or more body optical fibre ribbons 212. The plurality of safeguarding elements 214, 216 may have the safeguarding element width of 5 percent to 20 percent greater than width of the one or more body optical fibre ribbons 212. The plurality of safeguarding elements 214, 216 may have a safeguarding element height of 5 percent to 20 percent greater than height of the one or more body optical fibre ribbons 212. The plurality of safeguarding elements 214, 216 in the buffer tube 202 does not contain a plurality of optical fibres.

In addition, width of the first type of optical fibre ribbon is 3 millimetres. Further, width of the first type of optical fibre ribbon may vary. Furthermore, width of the second type of optical fibre ribbon is 3.35 millimetres. Moreover, width of the second type of optical fibre ribbon may vary. Also, width of the plurality of safeguarding elements 214, 216 is 3.35 millimetres corresponding to width of the first type of optical fibre ribbon. Also, width of the plurality of safeguarding elements 214, 216 is 3.6 millimetres corresponding to width of the second type of optical fibre ribbon. Also, the first type of optical fibre ribbon is a flexible ribbon. Also, the second type of optical fibre ribbon is a flat ribbon.

The plurality of safeguarding elements 214, 216 may have a corrugated shape. The plurality of safeguarding elements 214, 216 may have corner protected shape. The plurality of safeguarding elements 214, 216 may have any suitable shape of the like. The plurality of safeguarding elements 214, 216 in the buffer tube 202 may be made of bi-axially oriented polypropylene. The plurality of safeguarding elements 214, 216 in the buffer tube 202 may be made of acrylates. The plurality of safeguarding elements 214, 216 in the buffer tube 202 may be made of polypropylene. The plurality of safeguarding elements 214, 216 in the buffer tube 202 may be made of nylon 12. The plurality of safeguarding elements 214, 216 in the buffer tube 202 may be made of any suitable material of the like.

In addition, the buffer tube 202 includes the water swellable layer 210. The buffer tube 202 surrounds the water swellable layer 210. The water swellable layer is designed to prevent water ingression inside the optical fibre cables. The water swellable layer 210 is used to prevent ingression of water in the buffer tube 202. In addition, the water swellable layer 210 touches inner surface of the buffer tube 202. Further, the water swellable layer 210 surrounds the optical fibre ribbon stack. Furthermore, the water swellable layer 210 allows binding of the optical fibre ribbon stack to arrange the optical fibre ribbon stack in the buffer tube 202. Moreover, the water swellable layer 210 may have less width than a width of the buffer tube 202. Also, less width of the water swellable layer 210 provides free space between the optical fibre ribbon stack and inner wall of the buffer tube 202. Also, free space between the optical fibre ribbon stack and inner wall of the buffer tube 202 reduces stress on optical fibres positioned at edges of the optical fibre ribbon stack. The water swellable layer 210 includes water swellable yarns. In addition, number of the water swellable yarns in the water swellable layer 210 of the buffer tube 202 is 8. Further, number of the water swellable yarns in the water swellable layer 210 of the buffer tube 202 may vary.

The optical fibre cable 100 includes a plurality of buffer tubes 202 and a plurality of interstitial fillers 114 in spaces between the plurality of buffer tubes 202. The optical fibre cable 100 includes a central strength member 102, a first layer of buffer tubes 104, a second layer of buffer tubes 106, a first water blocking tape 108, a second water blocking tape 110 and a sheath 112. In addition, the optical fibre cable 100 includes a plurality of water swellable yarns 116, a plurality of embedded strength members 118 and one or more ripcords 120. The structure of the optical fibre cable 100 may vary.

The optical fibre cable 100 includes the central strength member 102. The central strength member 102 is used to protect a fibre cable from stresses during installation of the fibre cable. In addition, the central strength member 102 provides tensile strength and stiffness to the fibre cable. The central strength member 102 may have diameter of about 0.8 millimetre. The diameter of the central strength member 102 may vary. The central strength member 102 provides anti-buckling strength to the optical fibre cable 100. In addition, the central strength member 102 provides stiffness to the optical fibre cable 100. The central strength member 102 is made of fibre reinforced plastic. The central strength member 102 may be made of any other suitable material.

The optical fibre cable 100 includes the plurality of buffer tubes 202. The plurality of buffer tubes 202 is arranged in the optical fibre cable 100. The plurality of buffer tubes 202 is arranged concentrically inside a core of the optical fibre cable 100. The plurality of buffer tubes 202 is arranged in two concentric layers of buffer tubes in the optical fibre cable 100. The plurality of buffer tubes 202 includes the first layer of buffer tubes 104 and the second layer of buffer tubes 106. The second layer of buffer tubes 106 surrounds the first layer of buffer tubes 104. The first layer of buffer tubes 104 and the second layer of buffer tubes 106 include the plurality of buffer tubes 202. In addition, each of the plurality of buffer tubes 202 in the first layer of buffer tubes 104 and the second layer of buffer tubes 106 may correspond to the buffer tube 202 of FIG. 2, FIG. 3, FIG. 4, FIG. 5 or FIG. 6. There may be more layers of buffer tubes in the optical fibre cable 100.

The first layer of buffer tubes 104 is inner layer of the plurality of buffer tubes 202. In addition, the second layer of buffer tubes 106 is outer layer of the plurality of buffer tubes 202. The first layer of buffer tubes 104 of the plurality of buffer tubes 202 surrounds the central strength member 102. In addition, each buffer tube in the first layer of buffer tubes 104 and the second layer of buffer tubes 106 are circular in shape. Further, each buffer tube in the first layer of buffer tubes 104 and the second layer of buffer tubes 106 may have any suitable shape. Furthermore, each of the plurality of buffer tubes 202 is made of polypropylene material. Moreover, each of the plurality of buffer tubes 202 is made of LSZH. Also, each of the plurality of buffer tubes 202 is made of flame retardant polypropylene. Also, each of the plurality of buffer tubes 202 is made of flame retardant polybutylene terephthalate. Also, each of the plurality of buffer tubes 202 is made of any suitable material of the like.

In addition, number of the plurality of buffer tubes 202 in the first layer of buffer tubes 104 is 3. Further, number of the plurality of buffer tubes 202 in the first layer of buffer tubes 104 may vary. Furthermore, number of the plurality of buffer tubes 202 in the second layer of buffer tubes 106 is 9. Moreover, number of the plurality of buffer tubes 202 in the second layer of buffer tubes 106 may vary. Also, each of the plurality of buffer tubes 202 is characterized by an inner diameter and an outer diameter. The inner diameter of each of the plurality of buffer tubes 202 is about 5.2 millimetres. The inner diameter of each of the plurality of buffer tubes 202 is in a range of about 5-6 millimetres. The inner diameter of each of the plurality of buffer tubes 202 may vary. The outer diameter of each of the plurality of buffer tubes 202 is about 6 millimetres. The outer diameter of each of the plurality of buffer tubes 202 is in a range of about 6-7 millimetres. The outer diameter of each of the plurality of buffer tubes 202 may vary.

Furthermore, each of the plurality of buffer tubes 202 may include the optical fibre ribbon stack shown in FIGS. 2-6. In addition, the optical fibre ribbon stack includes the plurality of optical fibre ribbons. Further, number of the plurality of optical fibre ribbons in the optical fibre ribbon stack is 12. Furthermore, number of the plurality of optical fibre ribbons in the optical fibre ribbon stack may vary. Moreover, each of the plurality of optical fibre ribbons includes the plurality of optical fibres 208. Also, the optical fibre cable 100 may include any buffer tube configuration shown in FIGS. 2-6.

In addition, number of the plurality of optical fibres in each of the plurality of optical fibre ribbons is 12. Further, number of the plurality of optical fibres in each of the plurality of optical fibre ribbons may vary. Furthermore, total number of optical fibres in each buffer tube of the plurality of buffer tubes 202 is 144. Moreover, total number of optical fibres in each buffer tube of the plurality of buffer tubes 202 may vary. Also, total number of the plurality of buffer tubes 202 in the optical fibre cable 100 is 12. Also, total number of the plurality of buffer tubes 202 in the optical fibre cable 100 may vary. Also, total number of optical fibres in the optical fibre cable 100 is 1728 corresponding to 12 buffer tubes. Also, total number of optical fibres in the optical fibre cable 100 may vary as per variation in number of the plurality of optical fibre ribbons in each of the plurality of buffer tubes 202. Also, total number of optical fibres in the optical fibre cable 100 may vary as per variation in number of the plurality of optical fibres in each of the plurality of optical fibre ribbons. Also, total number of the plurality of optical fibres in the optical fibre cable 100 may vary as per variation in total number of the plurality of buffer tubes 202 in the optical fibre cable 100.

The optical fibre cable 100 includes the first water blocking tape 108. A water blocking tape prevents ingression of water inside an optical fibre cable. The first water blocking tape 108 surrounds the first layer of buffer tubes 104. In addition, the first water blocking tape 108 provides relatively increased circular surface after the first layer of buffer tubes 104. Further, the increased circular space enables the proper arrangement of the second layer of buffer tubes 106 over the first layer of buffer tubes 104 without crushing any buffer tube 202 in the second layer of buffer tubes 106 of the optical fibre cable 100. The optical fibre cable 100 includes the second water blocking tape 110. The second water blocking tape 110 surrounds the second layer of buffer tubes 106. The second water blocking tape 110 prevents water ingression inside the first layer of buffer tubes 104 and the second layer of buffer tubes 106. In addition, the second water blocking tape 110 prevents bundling of the first layer of buffer tubes 104 and the second layer of buffer tubes 106.

The optical fibre cable 100 includes the sheath 112. A sheath is used to provide inherent ability to an optical fibre cable to resist crushes, kinks and tensile stress. The sheath 112 is made of medium density polyethylene material. Medium-density polyethylene (MDPE) is a type of polyethylene defined by a density range of about 0.926-0.940 gram per cubic centimetre. The sheath 112 is made of low smoke zero halogen material. The sheath 112 is made of polyvinyl chloride. The sheath 112 is made of any suitable material of the like.

The optical fibre cable 100 includes the plurality of interstitial fillers 114. The plurality of interstitial fillers 114 are positioned inside a core of the optical fibre cable 100. The plurality of interstitial fillers 114 is arranged in positioned in spaces between the plurality of buffer tubes 202. In addition, a number of the plurality of interstitial fillers 114 may be greater than or equal to a number of the plurality of buffer tubes 202.

Further, the plurality of interstitial fillers 114 may be made of fibre reinforced plastic. Furthermore, the plurality of interstitial fillers 114 may be made of any suitable material. The plurality of interstitial fillers 114 is placed in interstitial spaces between the plurality of buffer tubes. Moreover, the plurality of interstitial fillers 114 is placed between the first layer of buffer tubes 104 and the second layer of buffer tubes 106. Also, the plurality of interstitial fillers 114 is made of any suitable material of the like. In addition, the plurality of interstitial fillers 114 reduces stress on the plurality of optical fibres by preventing shrinkage of polymer material during temperature cycling. Further, presence of the plurality of interstitial fillers 114 in the optical fibre cable 100 reduces interstitial space between the plurality of buffer tubes 202.

At least one interstitial filler of the plurality of interstitial fillers 114 may be coated with high density polyethylene. In addition, at least one interstitial filler of the plurality of interstitial fillers 114 present between the first layer of buffer tubes 104 may be coated with high density polyethylene. Further, at least one interstitial filler of the plurality of interstitial fillers 114 present between the first layer of buffer tubes 104 is coated with low smoke zero halogen material. Furthermore, at least one interstitial filler of the plurality of interstitial fillers 114 present between the first layer of buffer tubes 104 is coated with any suitable coating material of the like. In addition, the coating over at least one interstitial filler of the plurality of interstitial fillers 114 present between the first layer of buffer tubes 104 is characterized by thickness. The coating over at least one interstitial filler of the plurality of interstitial fillers 114 present between the first layer of buffer tubes 104 may have thickness of about 0.425 millimetre. The thickness of the coating over at least one interstitial filler of the plurality of interstitial fillers 114 present between the first layer of buffer tubes 104 may vary.

At least one interstitial filler of the plurality of interstitial fillers 114 present between the second layer of buffer tubes 106 may be coated with high density polyethylene. In addition, at least one interstitial filler of the plurality of interstitial fillers 114 present between the second layer of buffer tubes 106 is coated with low smoke zero halogen material. Further, at least one interstitial filler of the plurality of interstitial fillers 114 present between the second layer of buffer tubes 106 is coated with any suitable coating material of the like. The coating over at least one interstitial filler of the plurality of interstitial fillers 114 present between the second layer of buffer tubes 106 is characterized by thickness. The coating over at least one interstitial filler of the plurality of interstitial fillers 114 present between the second layer of buffer tubes 106 may have thickness of about 0.5 millimetre. The thickness of the coating over at least one interstitial filler of the plurality of interstitial fillers 114 present between the second layer of buffer tubes 106 may vary. The optical fibre cable 100 may include combination of one or more first interstitial fillers with coating and one or more second interstitial fillers without coating.

The plurality of interstitial fillers 114 in the first layer of buffer tubes 104 may have a first diameter and a second diameter in the optical fibre cable 100. The first diameter is a diameter of the plurality of interstitial fillers 114 without coating in the first layer of buffer tubes 104. The second diameter is a diameter of the plurality of interstitial fillers 114 with upcoating in the first layer of buffer tubes 104. The plurality of interstitial fillers 114 in the first layer of buffer tubes 104 may have the first diameter of 1.4 millimeters. The plurality of interstitial fillers arranged in spaces between the first layer of buffer tubes 104 may have the first diameter in a range of 1 to 2 millimeters. The plurality of interstitial fillers 114 in the first layer of buffer tubes 104 may have the second diameter of 2.25 millimeters with a coating of high density polyethylene. The plurality of interstitial fillers arranged in spaces between the first layer of buffer tubes 104 may have the second diameter in a range of 2 to 3 millimeters. The first diameter and the second diameter of the plurality of interstitial fillers 114 in the first layer of buffer tubes 104 may vary.

The plurality of interstitial fillers 114 in the second layer of buffer tubes 106 may have a first diameter and a second diameter in the optical fibre cable 100. The first diameter is a diameter of the plurality of interstitial fillers 114 without coating in the second layer of buffer tubes 106. The second diameter is a diameter of the plurality of interstitial fillers 114 with upcoating in the second layer of buffer tubes 106. The plurality of interstitial fillers 114 in the second layer of buffer tubes 106 may have the first diameter of 0.8 millimeter. The plurality of interstitial fillers 114 arranged in spaces between the second layer of buffer tubes 106 may have the first diameter in a range of 0.6 to 1.1 millimeters. The plurality of interstitial fillers 114 in the second layer of buffer tubes 106 may have the second diameter of 1.8 millimeters with a coating of high density polyethylene. The plurality of interstitial fillers arranged in spaces between the second layer of buffer tubes 106 may have the second diameter in a range of 1 to 2 millimeters. The first diameter and the second diameter of the plurality of interstitial fillers 114 in the second layer of buffer tubes 106 may vary.

The optical fibre cable 100 includes the plurality of water swellable yarns 116. The plurality of water swellable yarns 116 is positioned inside the core of the optical fibre cable 100. In addition, the plurality of water swellable yarns 116 are positioned around the buffer tubes of the first layer of buffer tubes 104 and the second layer of buffer tubes 106. In addition, a number of the plurality of water swellable yarns 116 may be equal to a sum of a number of the plurality of interstitial fillers 114 and a number of the plurality of buffer tubes 202. Further, number of the plurality of water swellable yarns 116 between the first layer of buffer tubes 104 is 6. Furthermore, number of plurality of water swellable yarns 116 between the first layer of buffer tubes 104 may vary. Moreover, number of the plurality of water swellable yarns 116 between the second layer of buffer tubes 106 is 18. Also, number of the plurality of water swellable yarns 116 between the second layer of buffer tubes 106 may vary. In addition, the plurality of water swellable yarns 116 reduces overall diameter of the optical fibre cable 100.

The optical fibre cable 100 includes the plurality of embedded strength members 118. The plurality of embedded strength members 118 is embedded in the sheath 112. In addition, number of the plurality of embedded strength members 118 is 4. Further, number of the plurality of embedded strength members 118 may vary. Furthermore, each of the plurality of embedded strength members 118 is circular in cross section. The plurality of embedded strength members 118 extends longitudinally in the sheath 112 along length of the optical fibre cable 100. In addition, the plurality of embedded strength members 118 provides robustness and tensile strength to the optical fibre cable 100. Further, the plurality of embedded strength members 118 prevents the sheath 112 from shrinkage.

In addition, location of each of the plurality of embedded strength members 118 is diametrically opposite in a vertical plane. Further, location of each of the plurality of embedded strength members 118 is diametrically opposite in a horizontal plane. Furthermore, each of the plurality of embedded strength members 118 may be made of fibre reinforced plastic. Moreover, each of the plurality of strength members 118 is made of any suitable material of the like. Also, each of the plurality of embedded strength members 118 may have diameter of about 0.8 millimetre. Also, diameter of each of the plurality of embedded strength members 118 may vary.

The optical fibre cable 100 includes the one or more ripcords 120. A ripcord is a parallel cord that is positioned under the jacket of cable for purpose of facilitating jacket removal. The optical fibre cable 100 may have two rip cords. In addition, number of the one or more ripcords 120 in the optical fibre cable 100 may vary. Further, each of the one or more rip cords 120 is made of polyester. Furthermore, each of the one or more rip cords 120 is made of aramid fibres. Moreover, the one or more rip cords 120 is made of any suitable material of the like.

The optical fibre cable 100 is a compact high fibre count (1728F) cable with small diameter. The optical fibre cable 100 may have diameter of about 27.2 millimetres. The optical fibre cable 100 may have diameter in a range of about 25-30 millimetres. The diameter of the optical fibre cable 100 may vary. In addition, the optical fibre cable 100 provides minimal loss in data transmission. Further, the optical fibre cable 100 is easy to handle during installation and network designing.

Figure 7:
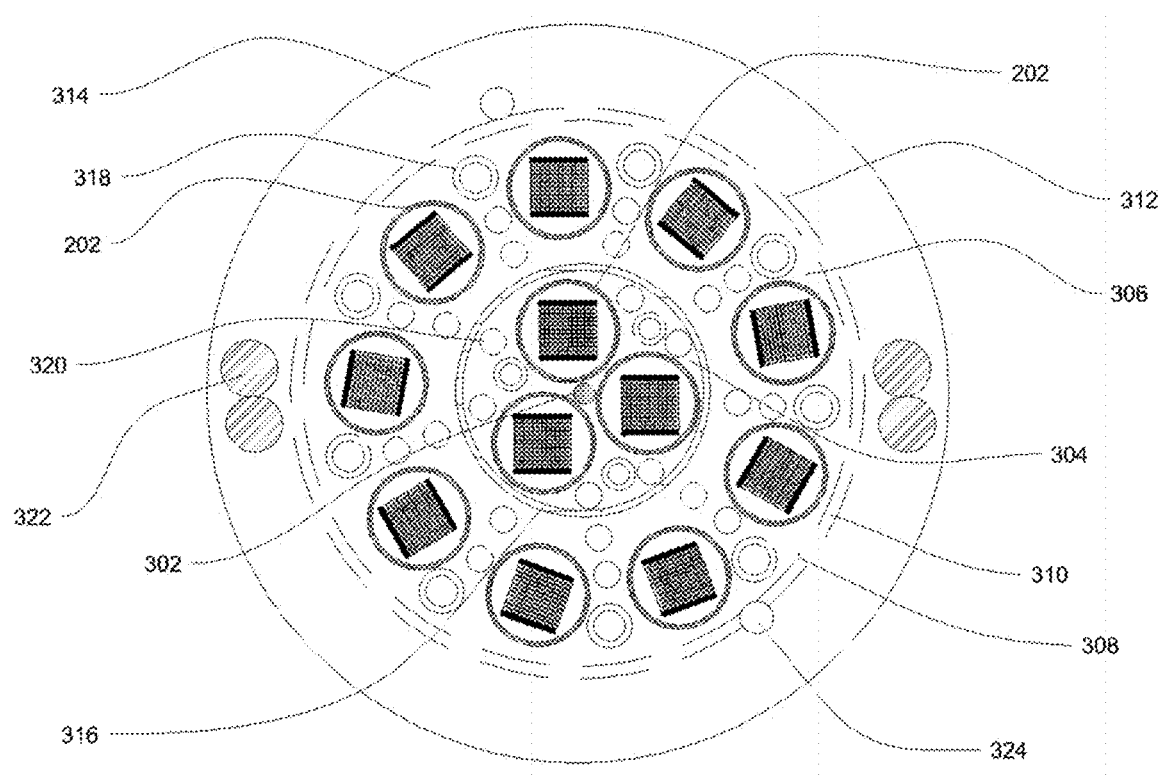
FIG. 7 illustrates a cross sectional view of a fire retardant optical fibre cable.

FIG. 7 illustrates a cross sectional view of a fire retardant optical fibre cable 700. The fire retardant optical fibre cable 700 is a high fibre count cable with 1728 fibres. In addition, the optical fibre cable 700 is an ISP or Inside Plant cable which can be installed inside of a building. Moreover, the optical fibre cable 700 is an OSP or Outside Plant cable which can be installed external to a building. The fire retardant optical fibre cable 700 includes a plurality of buffer tubes 202 and one or more numbers of interstitial fillers. The plurality of buffer tubes 202 are positioned inside a core of the fire retardant optical fibre cable 700. The one or more numbers of interstitial fillers are arranged in spaces between the plurality of buffer tubes. In addition, the fire retardant optical fibre cable includes at least one of thermal resistant water blocking tape 308, a fire resistant water blocking tape 310 and a Mica tape 312 wrapped over the core of the fire retardant optical fibre cable 700.

The fire retardant optical fibre cable 700 is similar in structure to the optical fibre cable 100 of FIG. 1A and FIG. 1B except the water blocking tape 110. In the FIG. 7 of the fire retardant optical fibre cable 700, the water blocking tape 110 is replaced by the thermal resistant water blocking tape 308, the fire resistant water blocking tape 310 and the Mica tape 312. The fire retardant optical fibre cable 700 includes a central strength member 302, a first layer of buffer tubes 304, a second layer of buffer tubes 306, a jacket 314, a water blocking tape 316, a plurality of water swellable yarns 320, a plurality of embedded strength members 322 and one or more ripcords 324. The fire retardant optical fibre cable 700 may have any other structure.

The elements of the fire retardant optical fibre cable 700 have similar dimensions, materials as the elements shown in optical fibre cable 100. The fire retardant optical fibre cable 700 includes the plurality of buffer tubes 202. The plurality of buffer tubes 202 is arranged concentrically inside a core of the fire retardant optical fibre cable 700. The plurality of buffer tubes 202 may be any buffer tube shown in FIGS. 2-6 (as explained above in detail in the detailed description of FIGS. 1-6).

The fire retardant optical fibre cable 700 includes the thermal resistant water blocking tape 308. The thermal resistant water blocking tape 308 surrounds the plurality of buffer tubes 202. In The thermal resistant water blocking tape 308 surrounds the first layer of buffer tubes 304 and the second layer of buffer tubes 306. The thermal resistant water blocking tape 308 is a water blocking tape coated with intumescent material. The thermal resistant water blocking tape 308 possesses water blocking capabilities and shows resistance against fire. The intumescent material swells when exposed to heat leading to passive protection in an event of a fire. In addition, the intumescent material increases in volume and decreases in density when exposed to fire. The intumescent material coating is done on a non-woven cloth coated. The non-woven cloth may be used in place of the water blocking tape. In addition, a first side of the thermal resistant water blocking tape 308 may face the jacket 314 of the fire retardant optical fibre cable 700. Further, a second side of the thermal resistant water blocking tape 308 without the intumescent material coating may face a core of the fire retardant optical fibre cable 700.

The fire retardant optical fibre cable 700 includes the fire resistant water blocking tape 310. The fire resistant water blocking tape 310 surrounds the thermal resistant water blocking tape 308. The fire resistant water blocking tape 310 possesses water blocking capabilities and shows resistance against fire. The fire resistant water blocking tape 310 is made of glass fabric for providing fire resistance and strength to the fire retardant optical fibre cable 700. Further, the fire retardant optical fibre cable 700 includes the Mica tape 312. The Mica tape 312 surrounds the fire resistant water blocking tape 310. The Mica tape 312 is a fire resistant water blocking tape. The Mica tape 312 possesses water blocking capabilities and shows resistance against fire. The Mica tape 312 acts as fire barrier.

The optical fibre cable 700 includes the water blocking tape 316. The water blocking tape 316 may have the intumescent material coating. The water blocking tape 316 is a fire retardant water blocking tape. The optical fibre cable 700 includes the one or more numbers of interstitial fillers. The one or more numbers of interstitial fillers includes a plurality of interstitial fillers 318. The plurality of interstitial fillers 318 are positioned inside a core of the fire retardant optical fibre cable 700. In addition, the plurality of interstitial fillers 318 is arranged in spaces between the first layer of buffer tubes 304 and the second layer of buffer tubes 306. The plurality of interstitial fillers 318 may be made of fibre reinforced plastic. The plurality of interstitial fillers 318 is made of any suitable material of the like. The number of the plurality of interstitial fillers 318 arranged in spaces between the first layer of buffer tubes 304 may be equal to number of a plurality of buffer tubes in the first layer of buffer tubes 304. The number of the plurality of interstitial fillers 318 arranged in spaces between the first layer of buffer tubes 304 is 3.

In addition, each of the plurality of interstitial fillers 318 is coated with a material selected from a group. The group consists of low smoke zero halogen material, flame retardant polyethylene material and flame retardant polypropylene material. The plurality of interstitial fillers 318 reduces stress on the plurality of optical fibres by preventing shrinkage of polymer material during temperature cycling. Further, presence of the plurality of interstitial fillers 318 in the fire retardant optical fibre cable 700 reduces interstitial space between the plurality of buffer tubes 202. The dimensions such as diameter and thickness of the plurality of interstitial fillers 318 are same as the plurality of interstitial fillers 114.

The fire retardant optical fibre cable 700 is a compact high fibre count (1728F) cable with small diameter. The optical fibre cable 700 may have diameter in a range of about 25-30 millimetres. The diameter of the fire retardant optical fibre cable 700 may vary. In addition, the fire retardant optical fibre cable 700 provides minimal loss in data transmission. Further, the optical fibre cable 700 is easy to handle during installation and network designing.

Figure 8:
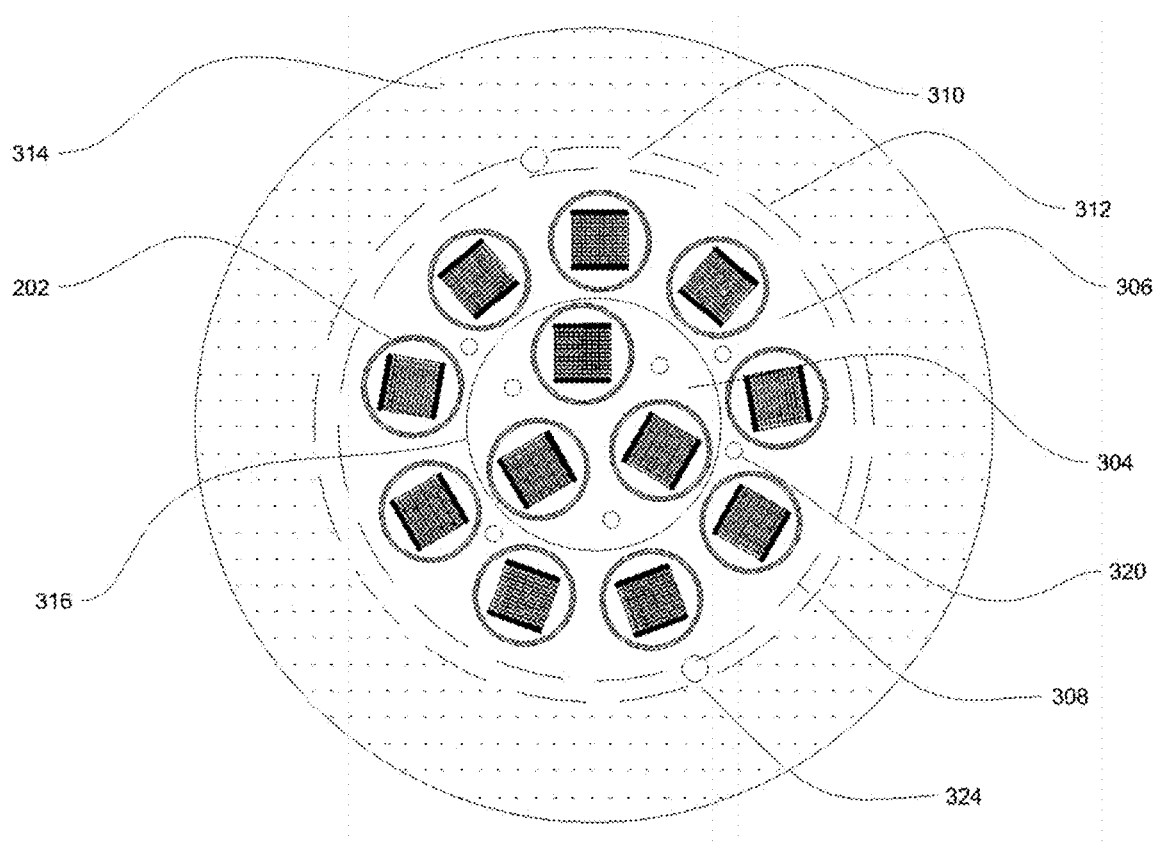
FIG. 8 illustrates a cross sectional view of another fire retardant optical fibre cable.

FIG. 8 illustrates a cross sectional view of another fire retardant optical fibre cable 800. The fire retardant optical fibre cable 800 is similar to the fire retardant optical fibre cable 700 of FIG. 7 with an exception that the fire retardant optical fibre cable 800 does not contain the plurality of interstitial fillers 318 and the plurality of embedded strength members 322. The fire retardant optical fibre cable 800 is a high fibre count cable with 1728 fibres. In addition, the optical fibre cable 800 is an ISP or Inside Plant cable which can be installed inside of a building. The fire retardant optical fibre cable 800 includes the central strength member 302, the first layer of buffer tubes 304, the second layer of buffer tubes 306, the thermal resistant water blocking tape 308 and the fire resistant water blocking tape 310. In addition, the fire retardant optical fibre cable 800 includes the Mica tape 312, the jacket 314, the water blocking tape 316, the plurality of water swellable yarns 320 and the one or more ripcords 324 (as explained above in the detailed description on FIG. 7). It is to be noted that functionality, material and values of various parameters of all other elements in the fire retardant optical fibre cable 800 is same as the elements in the fire retardant optical fibre cable 700.

Figure 9:
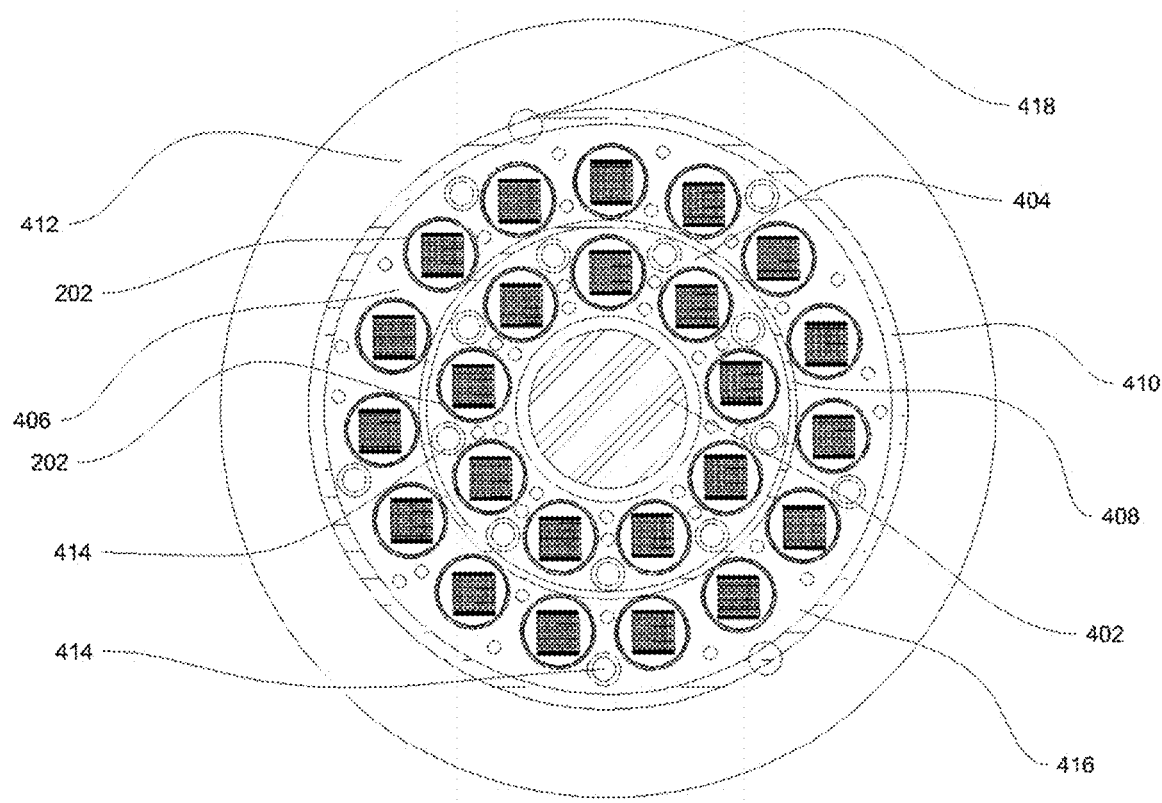
FIG. 9 illustrates a cross sectional view of an optical fibre cable having 3456 optical fibres.

FIG. 9 illustrates a cross sectional view of an optical fibre cable 900 having 3456 optical fibres. The optical fibre cable 900 is similar in structure to the optical fibre cable 100 of FIG. 1A and FIG. 1B and only difference is a number of buffer tubes in both the cables. The optical fibre cable 900 possesses more number of buffer tubes which makes it a higher fibre count cable than the optical fibre cable 100. Also, the optical fibre cable 900 does not contain any embedded strength members. In addition, the optical fibre cable 900 contains lesser number of interstitial fillers in an outer layer of buffer tubes as compared to the optical fibre cable 100 (explained below). The optical fibre cable 900 includes the plurality of buffer tubes 202. The plurality of buffer tubes 202 may be arranged in at least two concentric layers. In addition, the optical fibre cable 900 includes a plurality of interstitial fillers 414 in spaces between the plurality of buffer tubes 202. The plurality of interstitial fillers 414 may be arranged at an angle of 24-120 degrees with respect to a centre of the optical fibre cable 900. The optical fibre cable 900 includes a central strength member 402, a first layer of buffer tubes 404, a second layer of buffer tubes 406, a first water blocking tape 408, a second water blocking tape 410 and a sheath 412. In addition, the optical fibre cable 900 includes a plurality of water swellable yarns 416 and one or more ripcords 418. The structure of the optical fibre cable 900 may vary. The elements of the optical fibre cable 900 is same as the elements shown in the optical fibre cable 100. In addition, materials of different elements of the optical fibre cable 900 are same as the materials of the elements of the optical fibre cables 100, 700.

The optical fibre cable 900 includes the central strength member 402. The central strength member 402 may have diameter of about 4.5 millimetres. The diameter of the central strength member 402 may vary. The central strength member 402 may be coated with high density polyethylene. The central strength member 402 may be coated with any suitable coating material of the like. Furthermore, the high density polyethylene coating over the central strength member 402 is characterized by thickness. The high density polyethylene coating over the central strength member 402 may have thickness of about 2.9 millimetres. The thickness of the high density polyethylene coating over the central strength member 402 may vary. The diameter of the central strength member 402 along with the coating is 10.3 millimetres.

The optical fibre cable 900 includes the plurality of buffer tubes 202. The plurality of buffer tubes 202 is arranged concentrically inside a core of the optical fibre cable 900. The plurality of buffer tubes 202 may be any buffer tube shown in FIGS. 2-6 (as explained above in detail in the detailed description of FIGS. 1-7). The plurality of buffer tubes 202 includes the first layer of buffer tubes 304 the second layer of buffer tubes 306 similar to the optical fibre cable 100.

In addition, number of the plurality of buffer tubes 202 in the first layer of buffer tubes 404 is 9. Further, number of the plurality of buffer tubes 202 in the first layer of buffer tubes 404 may vary. Furthermore, number of the plurality of buffer tubes 202 in the second layer of buffer tubes 406 is 15. Moreover, number of the plurality of buffer tubes 202 in the second layer of buffer tubes 406 may vary. Further, each of the plurality of buffer tubes 202 is characterized by an inner diameter and an outer diameter. The inner diameter of each of the plurality of buffer tubes 202 is about 5 millimetres. The inner diameter of each of the plurality of buffer tubes 202 is in a range of about 4.5-5.5 millimetres. The inner diameter of each of the plurality of buffer tubes 202 may vary. The outer diameter of each of the plurality of buffer tubes 202 is about 5.6 millimetres. The outer diameter of each of the plurality of buffer tubes 202 is in a range of about 5-6 millimetres. The outer diameter of each of the plurality of buffer tubes 202 may vary.

In addition, number of the plurality of optical fibres in each of the plurality of optical fibre ribbons is 12. Further, number of the plurality of optical fibres in each of the plurality of optical fibre ribbons may vary. Furthermore, total number of optical fibres in the optical fibre ribbon stack encased inside each buffer tube of the plurality of buffer tubes is 144. Total number of optical fibres in each buffer tube of the plurality of buffer tubes 202 may vary. Moreover, total number of the plurality of buffer tubes 202 in the optical fibre cable 900 is 24. Total number of the plurality of buffer tubes 202 in the optical fibre cable 900 may vary. Also, total number of optical fibres in the optical fibre cable 900 is 3456 corresponding to 24 buffer tubes.

The optical fibre cable 900 includes the sheath 412. The sheath 412 is made of medium density polyethylene material. Medium-density polyethylene (MDPE) is a type of polyethylene defined by a density range of about 0.926-

0.940 gram per cubic centimetre. The sheath 412 is made of low smoke zero halogen material. The sheath 412 is made of polyvinyl chloride. The sheath 412 is made of any suitable material of the like.

The optical fibre cable 900 includes the plurality of interstitial fillers 414 similar to the interstitial fillers in the optical fibre cables 100, 700, 800. In addition, a number of the plurality of interstitial fillers 414 may be equal to a number of buffer tubes in each concentric layer of the at least two concentric layers. A number of the plurality of interstitial fillers 414 between at least one concentric inner layer of buffer tubes may be equal to a number of buffer tubes in the at least one concentric inner layer of buffer tubes. Further, a number of the plurality of interstitial fillers 414 between the first layer of buffer tubes 404 may be equal to a number of buffer tubes in the first layer of buffer tubes 404 of the plurality of buffer tubes. The at least one concentric outer layer of buffer tubes surrounds the at least one concentric inner layer of buffer tubes. Furthermore, a number of the plurality of interstitial fillers 414 in the at least one concentric outer layer of buffer tubes surrounding the at least one concentric inner layer of buffer tubes may be less than a number of a plurality of buffer tubes in the at least one concentric outer layer of buffer tubes. The number of the plurality of interstitial fillers 414 in the second layer of buffer tubes 406 may be less than a number of the plurality of buffer tubes in the second layer of buffer tubes 406.

The plurality of interstitial fillers 414 in the first layer of buffer tubes 404 may have a first diameter and a second diameter in the optical fibre cable 900. The first diameter is a diameter of the plurality of interstitial fillers 414 without coating in the first layer of buffer tubes 404. The second diameter is a diameter of the plurality of interstitial fillers 414 with upcoating in the first layer of buffer tubes 404. The plurality of interstitial fillers 414 in the first layer of buffer tubes 404 may have the first diameter of 1.2 millimeters. The plurality of interstitial fillers 414 arranged in spaces between the first layer of buffer tubes 404 may have the first diameter in a range of 1.0 to 1.5 millimeters. The plurality of interstitial fillers 414 in the first layer of buffer tubes 404 may have the second diameter of 1.85 millimeters with a coating of high density polyethylene. The plurality of interstitial fillers 414 arranged in spaces between the first layer of buffer tubes 404 may have the second diameter in a range of 1.5 to 2.0 millimeters. The first diameter and the second diameter of the plurality of interstitial fillers 414 in the first layer of buffer tubes 404 may vary.

The plurality of interstitial fillers 414 in the second layer of buffer tubes 406 may have a first diameter and a second diameter in the optical fibre cable 900. The first diameter is a diameter of the plurality of interstitial fillers 414 without coating in the second layer of buffer tubes 406. The second diameter is a diameter of the plurality of interstitial fillers 414 with upcoating in the second layer of buffer tubes 406. The plurality of interstitial fillers 414 in the second layer of buffer tubes 406 may have the first diameter of 0.8 millimeter. The plurality of interstitial fillers 414 arranged in spaces between the second layer of buffer tubes 406 may have the first diameter in a range of 0.5 to 1.0 millimeters. The plurality of interstitial fillers 414 in the second layer of buffer tubes 406 may have the second diameter of 1.6 millimeters with a coating of high density polyethylene. The plurality of interstitial fillers 414 arranged in spaces between the second layer of buffer tubes 406 may have the second diameter in a range of 1.5 to 2.0 millimeters. The first diameter and the second diameter of the plurality of interstitial fillers 414 in the second layer of buffer tubes 406 may vary.

The optical fibre cable 900 includes the plurality of water swellable yarns 416. The plurality of water swellable yarns 416 is positioned inside the core of the optical fibre cable 900. In addition, the plurality of water swellable yarns 416 are positioned around the buffer tubes of the first layer of buffer tubes 404 and the second layer of buffer tubes 406. Further, a number of the plurality of water swellable yarns 416 may be equal to a sum of a number of the plurality of interstitial fillers 414 and a number of the plurality of buffer tubes 202. Furthermore, number of the plurality of water swellable yarns 416 between the first layer of buffer tubes 404 is 18 (9+9). Moreover, number of plurality of water swellable yarns 416 between the first layer of buffer tubes 404 may vary.

In addition, a number of the plurality of water swellable yarns 416 in the second layer of buffer tubes 406 may be more than a number of the plurality of interstitial fillers 416 between the second layer of buffer tubes 406. Further, number of the plurality of water swellable yarns 416 between the second layer of buffer tubes 406 is 20 (15+5). Furthermore, number of the plurality of water swellable yarns 416 between the second layer of buffer tubes 406 may vary. In addition, the plurality of water swellable yarns 416 reduces overall diameter of the optical fibre cable 900.

The optical fibre cable 900 is a compact high fibre count (3456F) cable with small diameter. The optical fibre cable 900 may have diameter of about 36.4 millimetres. The optical fibre cable 900 may have diameter in a range of about 32-38 millimetres. The diameter of the optical fibre cable 900 may vary. In addition, the optical fibre cable 900 provides minimal loss in data transmission. Further, the optical fibre cable 900 is easy to handle during installation and network designing.

Role of filler ribbons in each of the optical fibre cables disclosed above changes depending on conditions where the optical fibre cables are deployed. In an example, if an optical fibre cable of the present disclosure is deployed in oil and gas with the cable going deep into earth, the filler ribbons are used to sense temperature and an alarm will be provided through a sensing mechanism. The filler ribbons can be used to sense pressure, humidity, sense movements which can be useful for defense purposes. The ribbon safeguarding/ribbon armor/sacrificial fillers/filler ribbon can serve the sensory purposes.

The foregoing descriptions of specific embodiments of the present technology have been presented for purposes of illustration and description. They are not intended to be exhaustive or to limit the present technology to the precise forms disclosed, and obviously many modifications and variations are possible in light of the above teaching. The embodiments were chosen and described in order to best explain the principles of the present technology and its practical application, to thereby enable others skilled in the art to best utilize the present technology and various embodiments with various modifications as are suited to the particular use contemplated. It is understood that various omissions and substitutions of equivalents are contemplated as circumstance may suggest or render expedient, but such are intended to cover the application or implementation without departing from the spirit or scope of the claims of the present technology.

Although the present disclosure has been explained in relation to its preferred embodiment(s) as mentioned above, it is to be understood that many other possible modifications and variations can be made without departing from the spirit and scope of the inventive aspects of the present invention. It is, therefore, contemplated that the appended claim or claims will cover such modifications and variations that fall within the true scope of the invention.

What is claimed is:

1. An optical fibre cable comprising:
   a plurality of buffer tubes; and
   a plurality of interstitial fillers arranged in spaces between the plurality of buffer tubes, wherein at least one interstitial filler of the plurality of interstitial fillers is coated with high density polyethylene, wherein a thickness of the high density polyethylene coating is less than or equal to 0.5 millimetre,
   wherein the plurality of buffer tubes is arranged in at least two concentric layers of buffer tubes such that the plurality of interstitial fillers are arranged in at least one outer concentric layer of the at least two concentric layers of buffer tubes.

2. The optical fibre cable as claimed in claim 1, wherein the plurality of interstitial fillers is made of fibre reinforced plastic coated with high density polyethylene.

3. The optical fibre cable as claimed in claim 1 further comprising a plurality of water swellable yarns such that a number of the plurality of water swellable yarns is equal to a sum of a number of the plurality of interstitial fillers and a number of the plurality of buffer tubes.

4. The optical fiber cable as claimed in claim 1, wherein the plurality of interstitial fillers is arranged at an angle of 24-120 degrees with respect to a centre of the optical fibre cable.

5. The optical fiber cable as claimed in claim 1, wherein a number of the plurality of interstitial fillers is greater than or equal to a number of the plurality of buffer tubes.

6. The optical fiber cable as claimed in claim 1, wherein the interstitial fillers arranged in spaces between a first layer of buffer tubes have a first diameter and the interstitial fillers arranged in spaces between a second layer of buffer tubes have a second diameter.

* * * * *